United States Patent
Miller et al.

(10) Patent No.: US 7,181,589 B2
(45) Date of Patent: Feb. 20, 2007

(54) SYSTEM AND METHOD FOR PERFORMING ADDRESS TRANSLATION IN A COMPUTER SYSTEM

(75) Inventors: Steven C. Miller, Livermore, CA (US); Martin M. Deneroff, Oakhurst, NJ (US); Curt F. Schimmel, San Ramon, CA (US); John Carter, Salt Lake City, UT (US); Lixin Zhang, Austin, TX (US); Michael Parker, Salt Lake City, UT (US)

(73) Assignee: Silicon Graphics, Inc., Mountain View, CA (US)

( * ) Notice: Subject to any disclaimer, the term of this patent is extended or adjusted under 35 U.S.C. 154(b) by 248 days.

(21) Appl. No.: 10/835,855

(22) Filed: Apr. 30, 2004

(65) Prior Publication Data

US 2005/0066147 A1    Mar. 24, 2005

Related U.S. Application Data

(60) Provisional application No. 60/467,063, filed on Apr. 30, 2003.

(51) Int. Cl.
G06F 12/10 (2006.01)
(52) U.S. Cl. ........................ 711/206; 711/208
(58) Field of Classification Search ............... 711/159, 711/203, 206, 207, 208
See application file for complete search history.

(56) References Cited

U.S. PATENT DOCUMENTS

| | | | |
|---|---|---|---|
| 3,902,164 A * | 8/1975 | Kelley et al. ............... 711/206 |
| 4,587,610 A * | 5/1986 | Rodman ...................... 711/207 |
| 5,144,551 A | 9/1992 | Cepulis | |
| 5,475,827 A * | 12/1995 | Lee et al. .................... 711/207 |
| 5,502,829 A * | 3/1996 | Sachs .......................... 711/207 |
| 6,272,612 B1 * | 8/2001 | Bordaz et al. .............. 711/203 |
| 6,282,625 B1 | 8/2001 | Porterfield | |
| 6,473,842 B1 * | 10/2002 | Tsutsumi .................... 711/159 |
| 7,003,647 B2 * | 2/2006 | Jacobs et al. ............... 711/207 |

OTHER PUBLICATIONS

Dally, "A Fast Translation Method for Paging on top of Segmentation" IEEE Transactions on Computers, 41 (Feb. 1992) No. 2, pp. 247-250.
Chiueh, "Eliminating for Address Translation Bottleneck for Physical Address Cache", ACM Sigplan Notices 27 (Sep. 1992) No. 9, pp. 137-148.
Bisiani, et al., "Programming the PLUS Distributed-Memory System", 1990 IEEE, pp. 690-696.
Sterbenz, et al., "Axon Network Virtual Storage for High Performance Distributed Applications", 1990 IEEE, pp. 484-491.

* cited by examiner

*Primary Examiner*—Pierre Bataille
*Assistant Examiner*—Paul Schlie
(74) *Attorney, Agent, or Firm*—Baker Botts L.L.P.

(57) ABSTRACT

An address translation unit generates a physical address for access to a memory from a virtual address using either a translation lookaside buffer or a segmentation buffer. If the virtual address falls within a predetermined range, the address translation unit will use the segmentation buffer to generate the physical address. Upon generation of the physical address, the memory will either receive data from or provide data to a processor in accordance with the instructions being processed by the processor.

17 Claims, 1 Drawing Sheet

SYSTEM AND METHOD FOR PERFORMING ADDRESS TRANSLATION IN A COMPUTER SYSTEM

RELATED APPLICATIONS

This application claims the benefit of U.S. Provisional Application Ser. No. 60/467,063 filed Apr. 30, 2003 and incorporated herein by reference.

TECHNICAL FIELD OF THE INVENTION

The present invention relates in general to computer memory processing and more particulary to a system and method for performing address translation in a computer system.

BACKGROUND OF THE INVENTION

In a computer system, the Translation Lookaside Buffer (TLB) is used to assist in the translation of virtual addresses to physical addresses in order to access data locations in a memory. A computer system may have many memory nodes from which a program can access data as needed. However, the TLB can only hold a limited number of entries. As a result, the TLB provides an inadequate reach for programs that access large data sets spread out across many memory nodes.

SUMMARY OF THE INVENTION

From the foregoing, it may be appreciated by those skilled in the art that a need has arisen for an address translation technique that extends beyond the capability of a conventional TLB implementation. In accordance with the present invention, a system and method for performing address translation in a computer system are provided that substantially eliminate or greatly reduce disadvantages and problems associated with conventional TLB implementations.

According to an embodiment of the present invention, a method of performing address translation in a computer system is provided that includes receiving a virtual address and determining whether the virtual address is within a range defined by a predetermined start of a block in a virtual address space and a predetermined block size. If the virtual address is within the range, an index to a physical base address and an offset are generated. A physical address is then generated in response to the offset and the physical base address. If the virtual address is not within the range, address translation is performed through a conventional translation lookaside buffer.

The present invention provides various advantages over conventional TLB implementations of which some, all, or none may be included in particular embodiments. For example, one technical advantage is to extend the address space of an executing program in the computer system. Another technical advantage is to reduce a number of TLB misses that would occur using only the conventional TLB implementation. Other technical advantages may be readily apparent to those skilled in the art from the following figures, description, and claims.

BRIEF DESCRIPTION OF THE DRAWINGS

For a more complete understanding of the present invention, reference is now made to the following description taken in conjunction with the accompanying drawings, wherein like reference numerals represent like parts, in which.

DETAILED DESCRIPTION OF THE INVENTION

Figure 1:
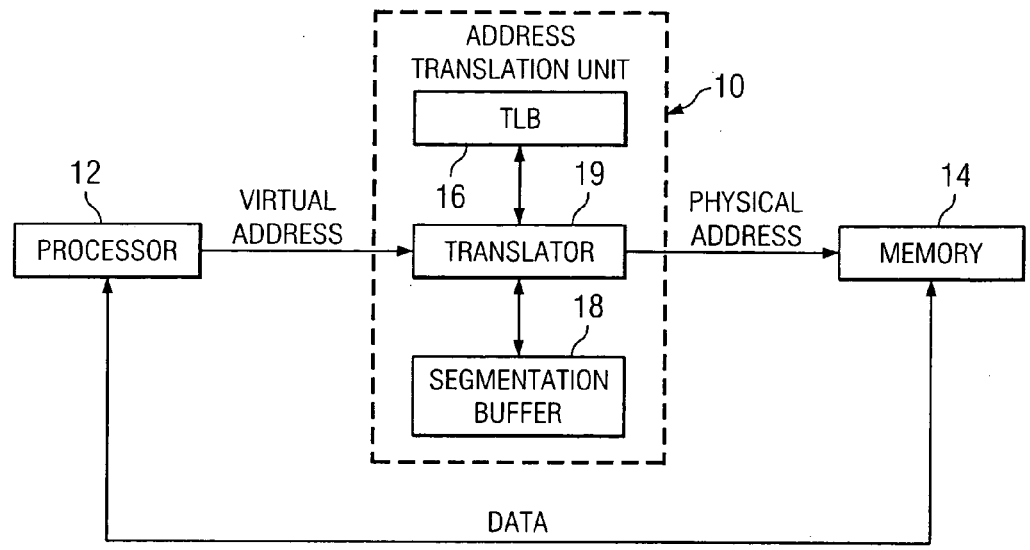
FIG. 1 illustrates an example of an address translation unit within a computer system.

FIG. 1 is a block diagram showing an address translation unit 10 in a computer system. Address translation unit 10 generates a physical address from a virtual address received from a processor 12. The physical address is used to access a memory 14. Memory 14 may be local to or remote from address translation unit 10 and/or processor 12.

Depending upon the virtual address received from processor 12, address translation unit 10 will generate the physical address for memory 14 access using either a translation lookaside buffer (TLB) 16 as in conventional computer system designs or a segmentation buffer 18 of the present invention. Upon generation of the physical address through a translator 19, memory 14 will either receive data from or provide data to processor 12 in accordance with the instructions being processed by processor 12.

Figure 2:
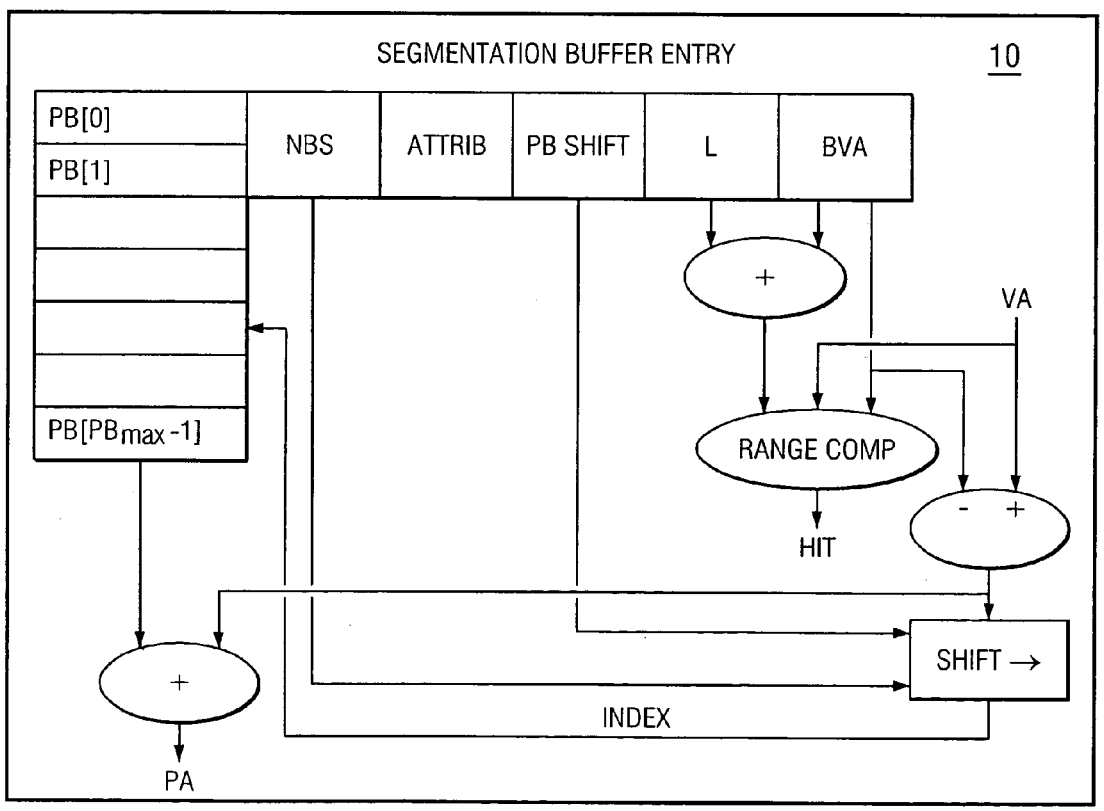
FIG. 2 illustrates an example of a segmentation buffer in the address translation unit.

FIG. 2 shows a simplified block diagram of segmentation buffer 18. Segmentation buffer 18 includes a number of special entries that include the following fields—Base Virtual Address (BVA), Length (L), Node Block Size (NBS), Physical Base Table (PB), Physical Base table Shift (PBSHIFT), and Attributes (Attrib). BVA represents a start of a block in the virtual address apace. L represents the total size of the block. NBS represents a block size per node N where N is the number of nodes containing the block. PB{0 . . . PBmax-1} represents a table including a physical base address for the block on each node. PBSHIFT represents which bits of the virtual address are used to index into the Physical Base table. Attributes are segment attributes akin to page attributes in TLB 16.

The determination as to whether the physical address is generated by TLB 16 or segmentation buffer 18 depends on whether the virtual address falls within a predetermined range. The predetermined range is defined as the range between BVA and BVA+L. If the virtual address does not fall within this range, a miss is identified and the physical address is generated using TLB 16. If the virtual address falls within this range, a hit is identified and the physical address is generated using segmentation buffer 18. The comparison of the virtual address to the range is performed for each entry in the Physical Base table. A miss indication is provided by segmentation buffer 18 in response to the virtual address not being in the range of any entry of the Physical Base table. This miss indication will cause the physical address to be generated using TLB 16. A hit indication is provided by segmentation buffer 18 in response to the virtual address falling within any range of any entry of the Physical Base table.

Upon identifying a hit, address translation unit 10 uses segmentation buffer 18 to generate a physical address corresponding to the virtual address. The physical address includes a physical base address obtained from the Physical Base table and an offset. The physical base address is identified by generating an index to the Physical base table. This index is determined according to the virtual address, the base virtual address associated with the hit indication, the NBS associated with the hit indication, and the PBSHIFT associated with the hit indication. This index is expressed as (VA-BVA)–NBS* PBSHIFT. The offset is a function of the virtual address, the base virtual address associated with the hit indication, and the NBS associated with the hit indication and is expressed as (VA-BVA)/NS. By combining the offset with the physical base address, the physical address is generated.

Thus, it is apparent that there has been provided, in accordance with the present invention, a system and method for performing address translation in a computer system that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statement made herein that is not otherwise reflected in the following claims.

What is claimed is:

1. A method for performing address translation in a computer system, comprising:
    identifying a base virtual address and a block size for a block of memory;
    adding the block size to the base virtual address to establish an end virtual address for the block of memory;
    receiving an input virtual address to a location in the memory;
    determining whether the input virtual address is within a range defined by the base virtual address and the end virtual address;
    generating an index to a physical base address in a physical base table in response to the virtual address being within the range, the index being generated by:
        subtracting the base virtual address from the input virtual address to obtain a first index result;
        subtracting a node block size from the first result to obtain a second index result;
        identifying particular bits in the second result to obtain the index;
    generating an offset, the offset being generated by:
        subtracting the base virtual address from the input virtual address to obtain a first offset result;
        dividing the first offset result by the node block size to obtain the offset;
    generating a physical address in response to the offset and the physical base address, the physical address being the physical base address plus the offset.

2. The method of claim 1, further comprising:
    generating the physical address from the virtual address through a translation lookaside buffer in response to the virtual address not being within the range.

3. The method of claim 1, further comprising: repeating the determination of whether the virtual address is within the range for each entry of the physical base table.

4. The method of claim 1, further comprising:
    generating a hit indication in response to the virtual address being in the range.

5. The method of claim 1, further comprising:
    generating a miss indication in response to the virtual address not being in the range.

6. The method of claim 1, further comprising:
    providing access to the location in memory in accordance with the physical address.

7. A system for performing address translation in a computer system, comprising:
    a processor operable to generate a virtual address to a memory location;
    an address translator operable to generate a physical address in response to the virtual address, the address translator operable to generate the virtual address using a translation buffer in response to the virtual address not being in a predetermined range, the address translator operable to generate the physical address using a segmentation buffer in response to the virtual address being in the range, wherein the address translator implements the method of claim 1;
    a memory operable to access the memory location from the physical address.

8. The system of claim 7, wherein the segmentation buffer includes a plurality of entries each having a base virtual address field, a total block size field, a node block size field, a physical base table, a shift field, and an attribute field.

9. The system of claim 8, wherein the address translator compares the virtual address to the range defined by the base virtual address field and the total block size field.

10. The system of claim 9, wherein the address translator generates a miss indication in response to the virtual address not being in the range of any entry of the segmentation buffer.

11. The system of claim 9, wherein the address translator generates a hit indication in response to the virtual address being within the range of any entry of the segmentation buffer.

12. The system of claim 7, wherein the processor is given access to the memory location identified by the physical address.

13. A system for performing address translation in a computer system, comprising:
    means for identifying a base virtual address and a block size for a block of memory;
    means for adding the block size to the base virtual address to establish an end virtual address for the block of memory;
    means for receiving an input virtual address to a location in the memory;
    means for determining whether the input virtual address is within a range defined by the base virtual address and the end virtual address;
    means for generating an index to a physical base address in a physical base table in response to the virtual address being within the range, the means for generating the index including:
        means for subtracting the base virtual address from the input virtual address to obtain a first index result;
        means for subtracting a node block size from the first result to obtain a second index result;
        means for identifying particular bits in the second result to obtain the index;
    means for generating an offset, the means for generating the offset including:
        means for subtracting the base virtual address from the input virtual address to obtain a first offset result;
        means for dividing the first offset result by the node block size to obtain the offset;
    means for generating a physical address in response to the offset and the physical base address, the physical address being the physical base address plus the offset.

14. The system of claim 13, further comprising:
    means for repeating the determination of whether the virtual address is within the range for each entry of the physical base table.

15. The system of claim 13, further comprising:
    means for generating a hit indication in response to the virtual address being in the range.

16. The system of claim 13, further comprising:
    means for generating a miss indication in response to the virtual address not being in the range.

17. The system of claim 13, further comprising:
    means for providing access to the location in memory in accordance with the physical address.

* * * * *